United States Patent
Maeki et al.

(10) Patent No.: US 10,877,173 B2
(45) Date of Patent: Dec. 29, 2020

(54) EXPLORATION SYSTEM AND DIAGNOSING METHOD THEREOF

(71) Applicant: Hitachi, Ltd., Tokyo (JP)

(72) Inventors: Akira Maeki, Tokyo (JP); Tomonori Sekiguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 407 days.

(21) Appl. No.: 15/753,989

(22) PCT Filed: Feb. 15, 2016

(86) PCT No.: PCT/JP2016/054250
§ 371 (c)(1),
(2) Date: Feb. 21, 2018

(87) PCT Pub. No.: WO2017/141304
PCT Pub. Date: Aug. 24, 2017

(65) Prior Publication Data
US 2018/0246239 A1 Aug. 30, 2018

(51) Int. Cl.
*G01V 1/30* (2006.01)
*G01V 11/00* (2006.01)
(Continued)

(52) U.S. Cl.
CPC .............. *G01V 1/303* (2013.01); *G01K 3/04* (2013.01); *G01V 1/16* (2013.01); *G01V 11/00* (2013.01);
(Continued)

(58) Field of Classification Search
None
See application file for complete search history.

(56) References Cited

U.S. PATENT DOCUMENTS

2005/0021279 A1   1/2005 Kuepper et al.
2008/0080310 A1   4/2008 Eperjesi et al.
(Continued)

FOREIGN PATENT DOCUMENTS

JP    2000-065606 A    3/2000
JP    2002-333398      11/2002
(Continued)

OTHER PUBLICATIONS

International Search Report of PCT/JP2016/054250 dated Apr. 26, 2016.
(Continued)

*Primary Examiner* — Cedric Johnson
(74) *Attorney, Agent, or Firm* — Mattingly & Malur, PC

(57) ABSTRACT

An exploration system includes an artificial seismic source, sensor terminals, an environmental sensor, and a computer, wherein each of a plurality of sensor terminals is provided with a velocity or acceleration sensor which detects vibration generated by the artificial seismic source, and an identifier which is unique to the velocity or acceleration sensor; the environmental sensor detects an external environment which influences the velocity or acceleration sensor; and the computer stores a deterioration model which possibly indicates, as a degree of deterioration, performance deterioration of the velocity or acceleration sensor by providing information about the external environment as a variable, associates, with the identifier, the information about the external environment detected by the environmental sensor, stores the information about the external environment as a usage history, and determines a deterioration state of the velocity or acceleration sensor or the sensor terminal on the basis of the deterioration model.

15 Claims, 8 Drawing Sheets

(51) Int. Cl.
  *G01V 1/16* (2006.01)
  *G01K 3/04* (2006.01)
  *G06K 19/07* (2006.01)
  *G06N 5/00* (2006.01)
  *G01P 15/125* (2006.01)
  *G01V 1/00* (2006.01)
(52) U.S. Cl.
  CPC ......... G06K 19/0717 (2013.01); G06N 5/003 (2013.01); *G01P 15/125* (2013.01); *G01V 1/003* (2013.01)

(56) References Cited

U.S. PATENT DOCUMENTS

| | | | |
|---|---|---|---|
| 2011/0203511 A1 | 8/2011 | Kuramoto | |
| 2011/0266055 A1* | 11/2011 | DiGiovanni | E21B 10/08 175/50 |
| 2011/0305114 A1 | 12/2011 | Golparian et al. | |
| 2013/0024179 A1* | 1/2013 | Mazzaro | F01K 13/02 703/18 |
| 2014/0217929 A1 | 8/2014 | Lin et al. | |
| 2016/0214853 A1* | 7/2016 | Thompson | B81B 3/0016 |
| 2016/0380856 A1* | 12/2016 | Ben Hamida | H04L 43/10 709/224 |

FOREIGN PATENT DOCUMENTS

| | | | | |
|---|---|---|---|---|
| JP | 2005-513431 A | 5/2005 | | |
| JP | 2010-019569 A | 1/2010 | | |
| JP | 2011-174854 A | 9/2011 | | |
| JP | 2014-099707 A | 5/2014 | | |
| JP | 2014-153363 A | 8/2014 | | |
| WO | 2015/013839 A1 | 2/2015 | | |
| WO | WO-2015013839 A1 * | 2/2015 | ............... | G01V 1/18 |
| WO | 2016/014363 A1 | 1/2016 | | |

OTHER PUBLICATIONS

Extended European Search Report received in corresponding European Application No. 16890447.2 dated Oct. 9, 2019.

* cited by examiner

F I G. 1
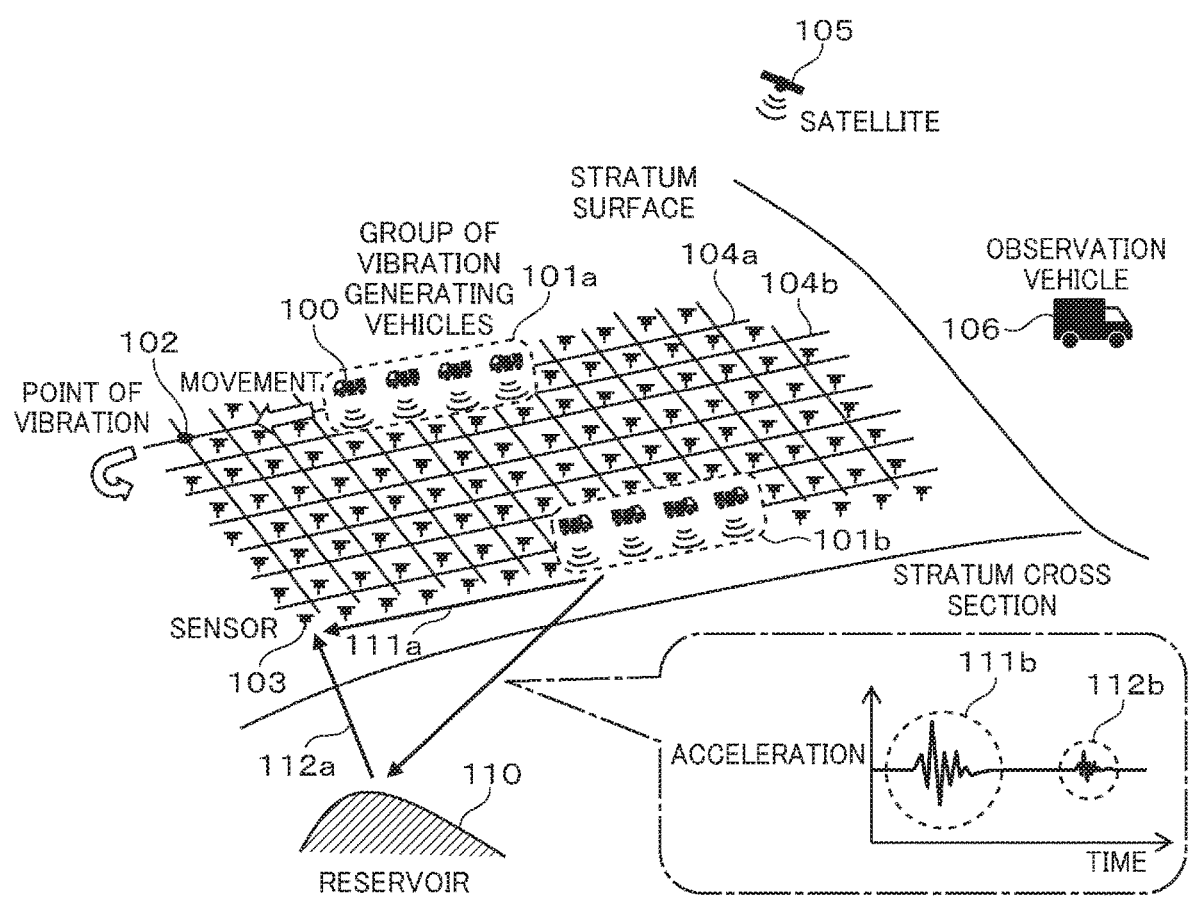

F I G. 2
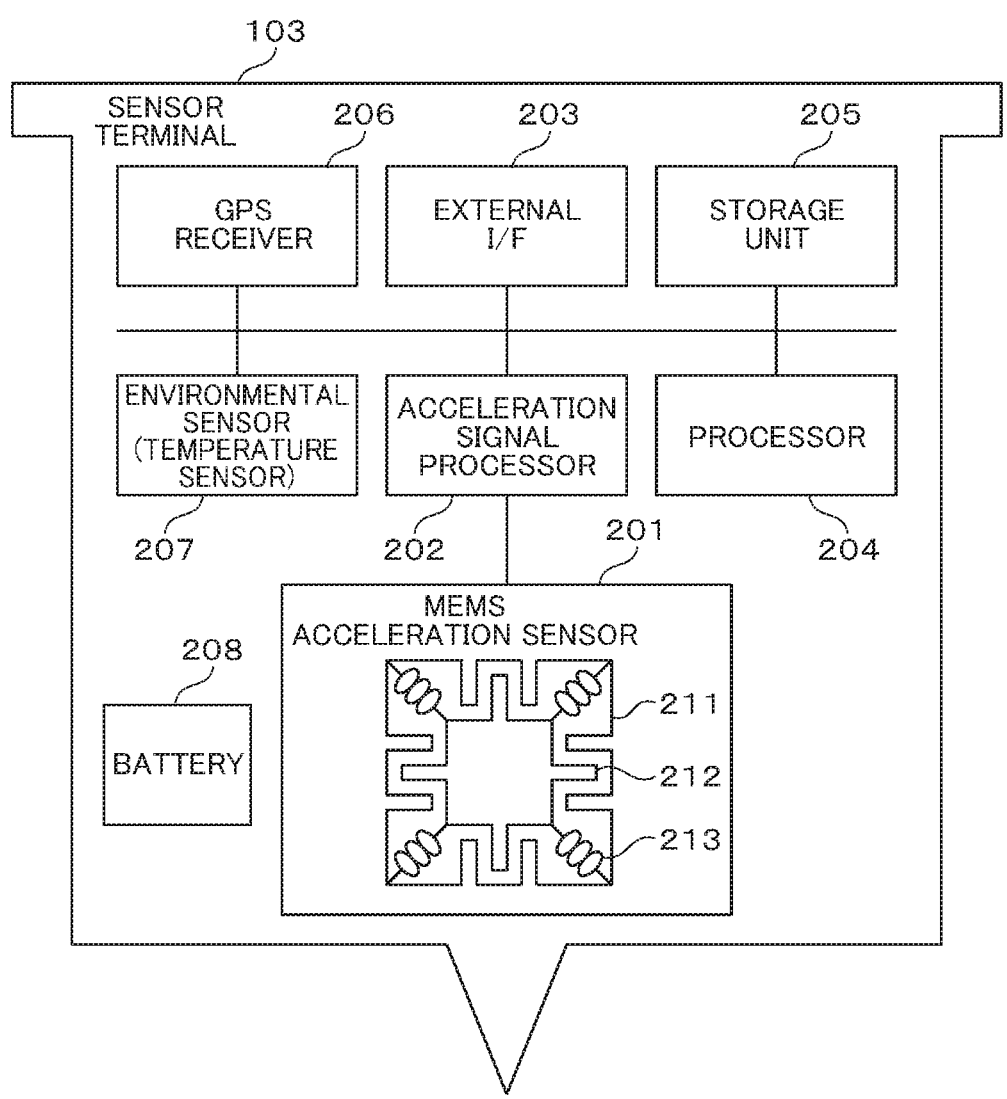

FIG. 4

| SENSOR ID (501) | POST-MANUFACTURE ELAPSED TIME (502) | ENVIRONMENT (503) | | | | ACCELERATION VALUE (504) | ... |
| --- | --- | --- | --- | --- | --- | --- | --- |
| | | TEMPERATURE | HUMIDITY | IMPACT VALUE | ... | | |
| NB1540-551264762 | 3-years 8-months 24-days | 32 | 50 | 0.04 | ... | 0.043 | ... |
| NB1540-551264762 | 3-years 8-months 25-days | 35 | 45 | 0.05 | ... | 0.051 | ... |
| NB1540-551264893 | 3-years 2-months 17-days | 40 | 30 | 0.03 | ... | 0.027 | ... |
| ⋮ | ⋮ | ⋮ | ⋮ | ⋮ | ⋮ | ⋮ | ⋮ |

F I G. 5

| | | | | | Environment | | Transportation |
|---|---|---|---|---|---|---|---|
| Sensor ID (601) | Exploration Field (602) | Geological Feature of Earth Surface (603) | Installation Location (604) | Installation Period (605) | Temperature Change | Road Surface Condition | (607) |
| | | | | | (606) | | |
| NB1540-551264762 | Desert B, Country A | Desert | 25 degrees north latitude, 40 degrees east longitude, average offset 5.8 km | June 3 to September 2, 2015 | Maximum 46°C, Minimum 8°C | Desert 50 km, Paved road 9 km | Trailer KMS2045a |
| NB1540-551264893 | Desert C, Country A | Desert | 24 degrees north latitude, 41 degrees east longitude, average offset 5.8 km | August 1 to November 5, 2015 | Maximum 48°C, Minimum 5°C | Desert 80 km, Paved road 9 km | Trailer KMS2045b |
| ... | ... | ... | ... | ... | ... | ... | ... |

FIG. 6

| 701 | 702 | 703 | 704 | 705 | |
|---|---|---|---|---|---|
| GROUP ID OF VIBRATION GENERATING VEHICLES | EXPLORATION FIELD | VIBRATION LOCATION | VIBRATION GENERATION TIME | VIBRATION INTENSITY | ... |
| UN4013a125 | DESERT B, COUNTRY A | 25.153 DEGREES NORTH LATITUDE, 40.201 DEGREES EAST LONGITUDE | 11H:8M:9S JUNE 14 | 200kN Vib Power 1kW | ... |
| UN4013a125 | DESERT B, COUNTRY A | 25.154 DEGREES NORTH LATITUDE, 40.201 DEGREES EAST LONGITUDE | 11H:10M:5S JUNE 14 | 200kN Vib Power 1kW | ... |
| ⋮ | ⋮ | ⋮ | ⋮ | ⋮ | ⋮ |

F I G. 9
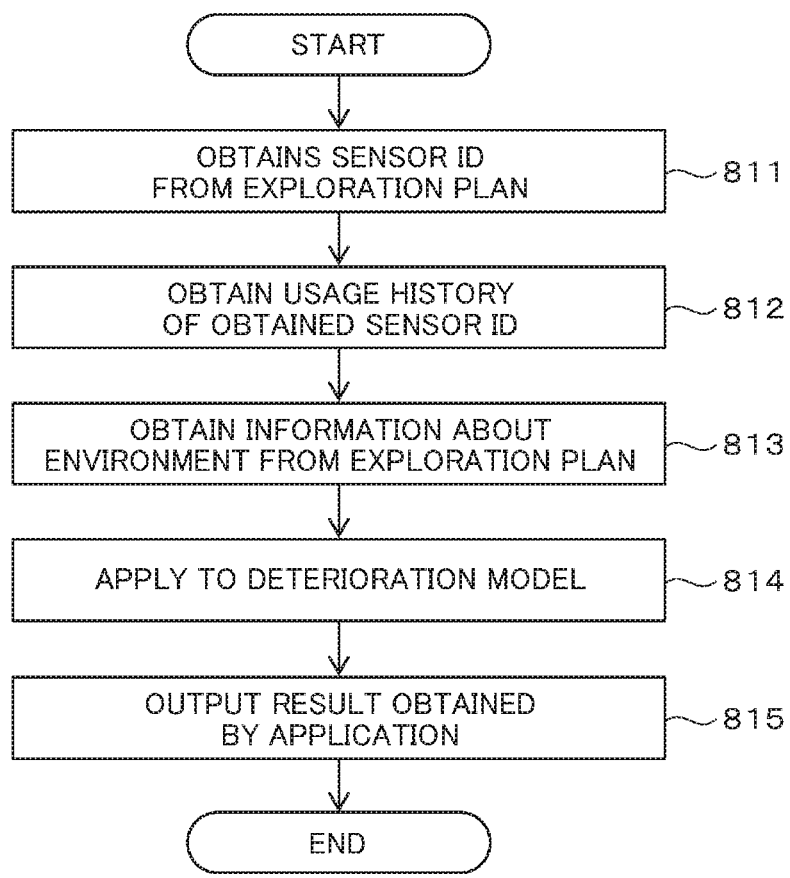

EXPLORATION SYSTEM AND DIAGNOSING METHOD THEREOF

TECHNICAL FIELD

The present invention relates to an exploration system and a diagnosing method thereof.

BACKGROUND ART

A large-sized reservoirs (petroleum reservoirs), which were easy to extract, has already been discovered and developed. Henceforth, exploration at a deeper depth and in a complex stratum is required. Meanwhile, improvement of sensor sensitivity or large-scale exploration on a ground surface depending on the depth is indispensable for exploration of these areas. The market requires both a system that implements these requirements and a low-cost operation.

A method referred to as physical exploration or reflection seismic exploration is present as a scheme widely used in resource exploration. In principle, elastic waves generated by an artificial seismic source (such as a dynamite, a vibration generating vehicle that vibrates the ground, etc.) are reflected at an interface of a stratum, for example, an interface of a petroleum layer, gas layer, water, a rock layer, etc., reflected waves returning to the ground surface are detected by a plurality of sensors installed on the ground surface or a borehole, and a reservoir layer image is constructed from data of these reflected waves.

A geophone corresponding to a speed sensor using a coil and a magnet has been known as a sensor that detects a reflected wave. However, the geophone has a frequency characteristic which is not flat and has low sensitivity, and thus another sensor having high sensitivity is desired. With regard to the sensor having high sensitivity, PTL 1 discloses a technology such as "diagnosis of failure such as bending of micro electro mechanical systems (MEMS) included in a movable portion and a fixed portion of a sensing unit, biting of foreign matter between a movable portion and a fixed portion", etc.

CITATION LIST

Patent Literature

PTL1: Japanese Patent Publication No. 2014-99707

SUMMARY OF THE INVENTION

Technical Problem

When the technology disclosed in Patent Document 1 is applied, an MEMS sensor having high sensitivity can be used, and failure diagnosis may be performed. However, even though a technology related to diagnosis after failure occurs is disclosed, there is not description of a technology for diagnosing occurrence of failure in advance.

In resource exploration, a large number of sensors are installed in a wide range and used over a long period of time. Thus, in diagnosis after installation and failure, replacement of a sensor in addition to interruption of resource exploration require a lot of cost. In addition, when a margin is examined based on an elapsed time from a date of manufacture of a sensor and replacement is performed before installation of the sensor, a lot of wasteful replacements occur and cost is incurred.

Therefore, an object of the invention is to lower cost related to management and operation of sensors used for resource exploration.

Solutions to Problem

A representative exploration system according to the invention is an exploration system including an artificial seismic source, a plurality of sensor terminals, an environmental sensor, and a computer, wherein each of the plurality of sensor terminals includes a velocity or acceleration sensor that detects vibration generated by the artificial seismic source, and an identifier unique to the velocity or acceleration sensor, the environmental sensor detects an external environment influencing the velocity or acceleration sensor, and the computer records a deterioration model allowed to indicate, as a degree of deterioration, performance deterioration of the velocity or acceleration sensor by providing information about an external environment as a variable, associates, with the identified, the information about the external environment detected by the environmental sensor, records the information about the external environment as a usage history, and determines a deterioration state of the velocity or acceleration sensor or the sensor terminals based on the deterioration model.

Advantageous Effects of the Invention

According to the invention, it is possible to lower cost related to management and operation of sensors used for resource exploration.

BRIEF DESCRIPTION OF THE DRAWINGS

FIG. 1 is a diagram illustrating an example of resource exploration.

FIG. 2 is a diagram illustrating an example of a sensor terminal.

FIG. 4 is a diagram illustrating an example of a usage history.

FIG. 5 is a diagram illustrating an example of information related to a sensor terminal in an exploration plan.

FIG. 6 is a diagram illustrating an example of information related to a vibration generating vehicle in the exploration plan.

FIG. 9 is a diagram illustrating an example of a process of predicting deterioration.

DESCRIPTION OF EMBODIMENTS

Figure 3:
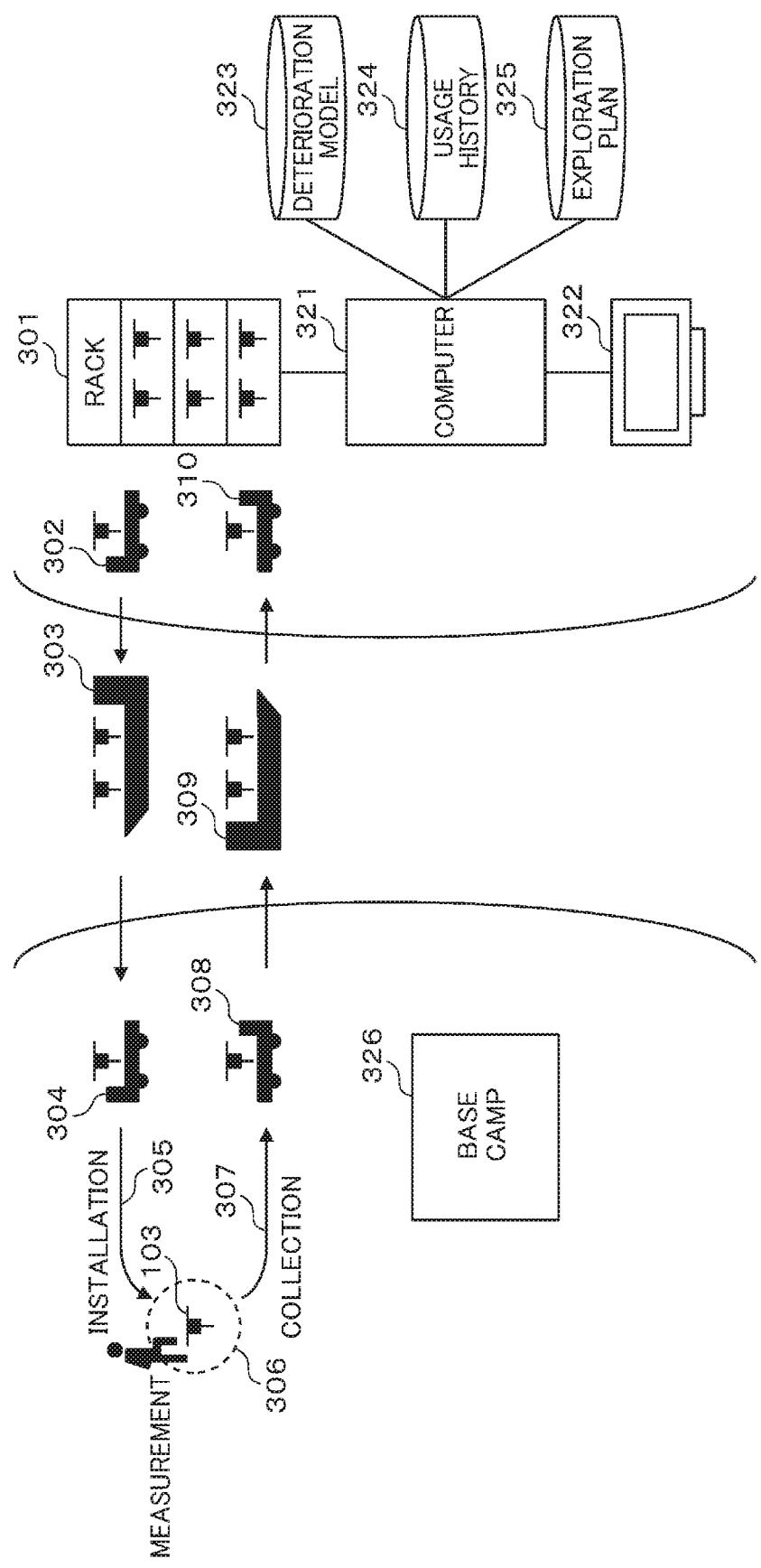
FIG. 3 is a diagram illustrating an example of treatment of the sensor terminal and a system.

Hereinafter, each of embodiments will be described with reference to drawings.

Embodiment 1

FIG. 1 is a diagram illustrating an example of resource exploration. FIG. 1 illustrates a simplified configuration to describe a point of the invention. However, a sensor or a point of vibration may not be arranged in an orderly manner as in the figure due to a design policy on the point of vibration or various factors in a field. A plurality of vibration generating vehicles 100 forms one group and becomes a group of vibration generating vehicles 101a to move to a point of vibration 102 and generate vibration.

For example, the group of vibration generating vehicles 101a may include four vibration generating vehicles 100. In FIG. 1, only one point of vibration 102 is illustrated as a point of vibration. However, all intersections of a lattice illustrated in FIG. 1 may correspond to the point of vibration. For this reason, the group of vibration generating vehicles 101a generates vibration at the point of vibration corresponding to each intersection of the lattice while moving straight on a movement path 104a.

Upon moving to the point of vibration 102 and generating vibration, the group of vibration generating vehicles 101a makes a U-turn and generates vibration while moving on a movement path 104b. In this way, the group of vibration generating vehicles 101a generates vibration at a point of vibration set in advance, for example, all the intersection of the lattice illustrated in FIG. 1 by repeating straight movement and a U-turn. For example, points of vibration are set at a certain interval determined in advance such as 50 m. For example, a location of the point of vibration is specified by a global positioning system (GPS) signal, etc. from a satellite 105.

For example, points of vibration at 100 thousand places, etc. are set according to a region of an exploration target area, etc. Since the number of points of vibration is large, the exploration target area may be divided into a plurality of parts using a plurality of groups of vibration generating vehicles 101 including the group of vibration generating vehicles 101a (described as a group of vibration generating vehicles 101 when the group of vibration generating vehicles 101a is not specified and the group of vibration generating vehicles in FIG. 1 is indicated, other reference symbols are described in the same manner), and exploration may be performed at the same time.

In addition, for example, the group of vibration generating vehicles 101 may correspond to a plurality of rows such as two rows. Depending on the density of the exploration target area or the points of vibration, two groups of vibration generating vehicles 101 in two rows rather than four groups of vibration generating vehicles 101 in one row may correspond to a preferred embodiment in some cases. In addition, in the group of vibration generating vehicles 101, for example, the number of vibration generating vehicles 100 may correspond to one. Vibration energy of the group of vibration generating vehicles 101 is measured in advance and recorded irrespective of a configuration of the group of vibration generating vehicles 101. The group of vibration generating vehicles 101a repeats vibration generation and movement and moves to a location of a group of vibration generating vehicles 101b.

A vibration caused by vibration generation of the group of vibration generating vehicles 101b is reflected by a boundary surface between a stratum such as a rock layer and a reservoir in which oil or gas is reserved, etc., becomes a reflected wave 112a, and is detected by a sensor terminal 103. A signal of the reflected wave 112a detected by the sensor terminal 103 is collected by an observation vehicle 106, etc., and then analyzed. There is a surface wave 111a that travels from the group of vibration generating vehicles 101b to the sensor terminal 103 on a ground surface even though the surface wave 111a corresponds to vibration not necessary for exploration. Use of the surface wave 111a will be described below.

The sensor terminal 103 detects vibration of the surface wave 111a and the reflected wave 112a as acceleration. In general, since a distance from the group of vibration generating vehicles 101b to the sensor terminal 103 is shorter than a distance from the group of vibration generating vehicles 101b to the sensor terminal 103 via a reservoir 110, acceleration 111b resulting from vibration of the surface wave 111a is detected earlier from a vibration generation time than acceleration 112b resulting from vibration of the reflected wave 112a, and has a large value.

As illustrated in FIG. 1, a plurality of sensor terminals 103 is disposed. Similarly to the points of vibration, for example, 100 thousand sensor terminals 103 are disposed according to a region of an exploration target area, etc. The sensor terminals 103 may be disposed in an area overlapping a movement path 104 of the group of vibration generating vehicles 101, and the sensor terminals 103 may be disposed in an area not overlapping the movement path 104 of the group of vibration generating vehicles 101. The exploration target area may correspond to a desert, an urban area, etc.

The sensor terminals 103 are installed before the group of vibration generating vehicles 101 starts first vibration generation, continue to be installed while the group of vibration generating vehicles 101 moves and generates vibration, and are collected when the group of vibration generating vehicles 101 finishes last vibration generation. Alternatively, exploration is performed while changing the sensor terminals 103 to expand an exploration area. For this reason, there is a possibility that the sensor terminals 103 will be installed in a harsh environment for a long time.

FIG. 2 is a diagram illustrating an example of the sensor terminal 103. A micro electro mechanical system (MEMS) acceleration sensor 201, as an acceleration sensor formed by an MEMS technology, detects vibration applied to the sensor terminal 103 such as the surface wave 111a, the reflected wave 112a, etc. as acceleration and converts the detected vibration into an electric signal. Even though the MEMS acceleration sensor 201 has high sensitivity, there is a possibility of deterioration or damage due to an influence from the outside, etc. since a microstructure is adopted and a hard material mechanically vibrates.

For example, the MEMS acceleration sensor 201 is an electrostatic capacity detection type acceleration sensor, and has a fixed portion 211 to which vibration from the outside is transmitted and a movable portion 212 coupled to the fixed portion 211 by an elastic body 213. The elastic body 213 transmits movement of the fixed portion 211 by transport of the sensor terminal 103 to the movable portion 212, and the movable portion 212 moves together with the fixed portion 211 and does not transmit vibration of the fixed portion 211 to the movable portion 212.

According to this structure, when the fixed portion 211 vibrates, a positional relationship between the fixed portion 211 and the movable portion 212 changes, and capacitance generated between the fixed portion 211 and the movable portion 212 changes. To clarify this change in capacitance, each of the fixed portion 211 and the movable portion 212 may have a protrusion for increasing an adjacent area as illustrated in FIG. 2. In addition, the MEMS acceleration sensor 201 may be vacuum-sealed using a package, etc. so that air between the fixed portion 211 and the movable portion 212 does not interfere with a change in relationship between the fixed portion 211 and the movable portion 212.

The MEMS acceleration sensor 201 is degraded and damaged in accordance with an externally applied factor according to an elapsed time after manufacture. For example, the externally applied factor corresponds to temperature or vibration.

Humidity may be included in this factor. Referring to temperature, a value thereof, the amount of change, time of change, etc. may correspond to factors. Referring to vibration, a value thereof, the amount of change, time of change, etc. may correspond to factors. Vibration will be further described below.

Due to these factors and problems of a material characteristic of the MEMS acceleration sensor 201, a package, etc., in the MEMS acceleration sensor 201, for example, a degree of vacuum between the fixed portion 211 and the movable portion 212 may decrease, and elasticity specification of the elastic body 213 may change. Further, there are possibilities of deterioration such as an increase in minimum width of detectable vibration and damage in which an increased minimum width exceeds a predetermined threshold value and vibration may not be detected.

The MEMS acceleration sensor 201 is not limited to the electrostatic capacity detection type acceleration sensor and may have another structure. However, an externally applied factor may be different. In addition, the MEMS acceleration sensor 201 may correspond to a sensor alone or a sensor chip. Besides, the MEMS acceleration sensor 201 may include a circuit. In addition, the MEMS acceleration sensor 201 may include a package for covering, and may correspond to a speed sensor other than the acceleration sensor.

An acceleration signal processor 202 amplifies an electric signal of acceleration converted by the MEMS acceleration sensor 201, converts the amplified analog electric signal into an acceleration value of a digital electric signal, and corrects the digital electric signal according to a detection characteristic of the MEMS acceleration sensor 201. For these amplification and correction, the acceleration signal processor 202 may have a feedback circuit and perform a feedback in accordance with a parameter of an amplification factor and a parameter of a correction factor. In addition, the acceleration signal processor 202 may correspond to an application specific integrated circuit (ASIC).

An external interface (I/F) 203 is an interface communicating with the outside of the sensor terminal 103, and may correspond to an interface of wireless communication, an interface of wired communication, or an interface of both wireless communication and wired communication.

The interface of wireless communication may communicate with the observation vehicle 106 illustrated in FIG. 1 via a plurality of terminals, etc. or communicate with a certain device via the satellite 105 not for GPS or a wide area wireless network (not illustrated). The interface of wired communication will be described below.

The external I/F 203 transmits the acceleration value converted by the acceleration signal processor 202. Here, the acceleration value may be temporarily stored in the storage unit 205, and the acceleration value read from the storage unit 205 may be transmitted. In addition, the external I/F 203 may transmit a value detected by the environmental sensor 207, and may transmit information input from a processor 204 and output received information to the processor 204. In FIG. 2, a mode in which the environmental sensor 207 is mounted in the sensor terminal 103 is adopted. However, equivalent data may be obtained in another embodiment.

The processor 204 controls each part of the sensor terminal 103 according to a program stored in advance. The processor 204 may transmit an acceleration value from the acceleration signal processor 202 to the external I/F 203, transmit a value from the environmental sensor 207 to the external I/F 203, or store a value in the storage unit 205 for the transmission. In addition, when operation parameters need to be set in the acceleration signal processor 202, the external I/F 203, a GPS receiver 206, and the environmental sensor 207, the operation parameters may be set according to a program.

The processor 204 may include one or a plurality of timers. The timer may count time from a preset time. The preset time may correspond to a time at which the sensor terminal 103 including the processor 204 is manufactured, correspond to a time at which the MEMS acceleration sensor 201 is manufactured, or correspond to a specific standard time. A period for counting may be counted without stopping, be counted only for an electric conduction period, or start to be counted and be suspended based on a preset condition.

The storage unit 205 may store a program for the processor 204, or store data necessary for the processor 204 to execute a program. The storage unit 205 may store values output by the acceleration signal processor 202, the GPS receiver 206, and the environmental sensor. Further, the storage unit 205 may store a sensor ID as information for identifying the MEMS acceleration sensor 201.

When the sensor terminal 103 includes a plurality of MEMS acceleration sensors 201, a plurality of sensor IDs may be stored. The sensor ID may not correspond to information for identifying the MEMS acceleration sensors 201, and may correspond to information for identifying the sensor terminal 103.

In addition, the processor 204 may correspond to a so-called microprocessor (single-chip microcomputer), the processor 204 may incorporate a storage unit, and a program or data stored in the storage unit 205 may be stored in the storage unit incorporated in the processor 204. In this case, the storage unit 205 may not be provided.

The GPS receiver 206 receives a GPS signal and outputs location information of the sensor terminal 103. The processor 204 may store the location information output by the GPS receiver 206 together with a value output by the acceleration signal processor 202 or the environmental sensor 207 in the storage unit 205, or transmit the location information and the value using the external I/F 203. A location of the sensor terminal 103 is specified by another device when the sensor terminal 103 is installed, and the GPS receiver 206 may not be provided. In addition, the GPS receiver 206 may receive a GPS signal and establish time synchronization.

For example, the environmental sensor 207 includes a temperature sensor that detects a temperature of the MEMS acceleration sensor 201 or an external temperature of the sensor terminal 103. The environmental sensor 207 may include a humidity sensor, and include an acceleration sensor separately from the MEMS acceleration sensor 201. The separate acceleration sensor may correspond to an acceleration sensor manufactured at a different time from that of the MEMS acceleration sensor 201, or correspond to an acceleration sensor having a different structure from that of the MEMS acceleration sensor 201.

The processor 204 compares the value output by the acceleration signal processor 202 or the environmental sensor 207 with a preset threshold value. When it is determined that the output value exceeds the threshold value, the processor 204 may store the values output from the acceleration signal processor 202, the environmental sensor 207, and the GPS receiver 206 together with a counted value of the timer in the storage unit 205, or transmit the values from the external I/F 203.

In addition, when a count of the timer reaches a value of a preset interval, the processor 204 may store the values output therefrom together with the counted value of the timer in the storage unit 205, or transmit the values from the external I/F 203. A battery 208 supplies power to each circuit in the sensor terminal.

FIG. 3 is a diagram illustrating an example of treatment of the sensor terminal 103 and a system. The sensor terminal 103 is stored in a rack 301, transported to an exploration area before exploration, transported from the exploration area after the exploration, and returned to the rack 301. A route from the rack 301 to a measurement point of the exploration area includes ground transportation by a trailer 302, sea transportation by a ship 303, and ground transportation by a trailer 304, and is installed 305 at the measurement point.

The sensor terminal 103 stored in the rack 301 in a warehouse, etc. is rarely vibrated. However, the sensor terminal 103 being transported by the trailer 302 and the ship 303 is vibrated due to transportation. When the exploration area is distant from the urban area, and the trailer 304 travels on an unpaved road, the sensor terminal 103 is more greatly vibrated.

In the installation 305, the sensor terminal 103 is lowered from the trailer 304 and strongly depressed by a worker in order to increase the degree of close contact with the ground surface, and thus is more greatly vibrated than during transportation by the trailer 302, the ship 303, and the trailer 304. In the installation 305, the sensor terminal 103 may undergo a large vibration that can also be referred to as an impact.

In measurement 306, the sensor terminal 103 is vibrated by the surface wave 111a, the reflected wave 112a, an earthquake, etc., and this vibration is smaller than vibration during transportation. Upon completion of the measurement 306, the sensor terminal 103 is subjected to collection 307 and subjected to transportation vibration by a trailer 308, a ship 309, and a trailer 310. The vibration during transportation is the same as the vibration during the transportation by trailer 302, ship 303 and trailer 304. Thereafter, the sensor terminal 103 is returned to the rack 301.

Alternatively, in a state of being stored in the rack 301, transportation to the exploration area may be performed via ground transportation, sea transportation, and land transportation, and installation, measurement and collection may be similarly performed. Thereafter, in a state of being stored in the rack 301, ground transportation, sea transportation, and land transportation may be performed from the exploration area to a point at which a storage house is present. In addition, when the storage house is present in the exploration area and used for storage, sea transportation may not be performed.

The rack 301 may store the sensor terminal 103 and collect information detected in the measurement 306 from the sensor terminal 103. When the external I/F 203 of the sensor terminal 103 includes the interface for wired communication, a value detected in the measurement 306 may be stored in the storage unit 205 of the sensor terminal 103, the external I/F 203 and the rack 301 may be wired, and the value stored in the storage unit 205 may be transmitted to the rack 301 as information. Further, data of a plurality of storage units 205 transmitted from the rack 301 to an information storage medium such as a magnetic tape, a hard disk drive (HDD), etc. (not illustrated) and held by the plurality of sensor terminals 103 may be recorded and held.

As described above, a system in which collected information of the sensor terminal 103 is collected by the rack 301 is referred to as a nodal system, and a system in which information is collected in the measurement 306 by the interface of the wired or wireless communication of the external I/F 203 is referred to as a telemetry system, etc.

Information collected by the rack 301 is transmitted to a computer 321 and stored in a usage history 324. The computer 321 as a general computer obtains information related to the sensor terminal 103 or the MEMS acceleration sensor 201 set to be used for exploration in an exploration plan 325 from the usage history 324 including information about the sensor terminal 103 or the MEMS acceleration sensor 201, obtains information about a specific deterioration model from a deterioration model 323 based on the obtained information, and determines a deterioration state of the sensor terminal 103 or the MEMS acceleration sensor 201 using information about a situation of exploration of the exploration plan 325.

The processing of the computer 321 will be further described below. Information related to exploration of the exploration plan 325 may be input from an input/output terminal 322 or may be input via a network (not illustrated). In addition, information of the deterioration model 323 may be input from the input/output terminal 322 or may be generated by the computer 321 as will be described below.

Information indicating a deterioration state determined by the computer 321 may be displayed on the input/output terminal 322. In addition, the information indicating the deterioration state may be converted into correction information of the MEMS acceleration sensor 201 according to the deterioration state and may be transmitted to the sensor terminal 103 via the rack 301.

Communication between the computer 321 and the sensor terminal 103 is not limited to via the rack 301. The computer 321 and the sensor terminal 103 may wirelessly communicate via the satellite 105, wirelessly communicate via the observation vehicle 106, or wirelessly communicate via both the satellite 105 and the observation vehicle 106 by the satellite 105 and the observation vehicle 106 wirelessly communicating with each other. Alternatively, a medium such as a magnetic tape or HDD may be interposed.

Transportation by trailer 304 and trailer 308 may be performed via a base camp 326. In addition, some or all of the rack 301, the computer 321, the input/output terminal 322, the deterioration model 323, the usage history 324, and the exploration plan 325 may be included in the base camp 326. Furthermore, the rack 301 may be located in the base camp 326, and the base camp 326 and the computer 321 may communicate with each other either by wire or wirelessly.

The deterioration model 323 includes a plurality of models. The deterioration model analyzes a factor causing deterioration and empirically detects and models how the factor is influenced by an external influence or time theoretically, experimentally, or based on actual product deterioration and damage history.

Here, one model corresponds to information related to a change in deterioration of the MEMS acceleration sensor 201. Various levels are assumed for the deterioration model. For example, a simplest model is an aging deterioration model, which may be one model since a material characteristic or a bonding characteristic of a semiconductor, a bonding wire, a package, etc. deteriorates over time and performance thereof deteriorates.

Furthermore, in a case in which the MEMS acceleration sensor is vacuum-sealed with a package, it is possible to create a more reliable deterioration model by classifying factors which cause deterioration of a degree of vacuum thereof according to a mounting problem, a problem of a material of the package, etc., and detecting a cause and a deterioration mode when each of the factors have the deterioration mode due to the cause.

As another example, impact damage or deterioration is assumed. For example, in the case of receiving an impact greater than or equal to a threshold value at high temperature, there is a possibility that a probability of deterioration and damage increases in a step function manner. Alternatively, it is possible to detect that the impact continuously accumulates and reaches fatigue failure theoretically, experimentally, or based on a past utilization result. In addition, when it is possible to detect a deterioration factor and a change in deterioration in advance, data to be collected can be detected, and thus it is possible not only to improve the deterioration model but also to simplify data collection.

The deterioration model 323 may be input from the input/output terminal 322. In addition, a rate of decrease of actually measured acceleration value from an acceleration value to be originally detected and output may be set as a degree of deterioration. Further, a value detected by the environmental sensor 207 may be input to the deterioration model 323, and the deterioration model 323 may output a degree of deterioration.

FIG. 4 is a diagram illustrating an example of the usage history 324. The usage history 324 corresponds to information collected from the sensor terminal 103 as described above and corresponds to so-called log information of the MEMS acceleration sensor 201. A value in a sensor ID column 501 corresponds to information for identifying the MEMS acceleration sensor 201 or the sensor terminal 103. The value may correspond to a notation that allows determination of a manufacturer or a product type. A value in a post-manufacture elapsed time column 502 corresponds to an elapsed time from when the MEMS acceleration sensor 201 or the sensor terminal 103 identified by the value in the sensor ID column 501 is manufactured, this time is set as a post-manufacture elapsed time, and this value corresponds to some or all of values counted by the timer of the processor 204 described above. Alternatively, the value may correspond to a time calculated from a difference between a date of manufacture and a present time.

A value in an environment column 503 corresponds to a value detected by the environmental sensor 207 of the sensor terminal 103 at a time recorded in the post-manufacture elapsed time column 502. The environment column 503 may include a temperature, humidity, and an impact value corresponding to items detectable by the environmental sensor 207, include some of these items, or include an item other than these items. The impact value in the environment column 503 may be detected by the MEMS acceleration sensor 201, or may correspond to the same value as that of an acceleration value column 504.

A value in the acceleration value column 504 corresponds to an acceleration value detected by the MEMS acceleration sensor 201 of the sensor terminal 103 and converted by the acceleration signal processor at a time recorded in the post-manufacture elapsed time column 502. The value in the acceleration value column 504 may be stored in another storage management unit and the usage history 324 may include the acceleration value column 504.

The exploration plan 325 includes information related to the sensor terminal 103 used in exploration of a scheduled plan and information about the group of vibration generating vehicles 101. The exploration plan 325 described below does not correspond to information related to exploration and corresponds to an external factor that influences deterioration of the MEMS acceleration sensor 201, and information specified by an exploration plan will be described. For this reason, the exploration plan 325 may include information related the exploration which will not be described below.

FIG. 5 is a diagram illustrating an example of information related to the sensor terminal 103 of the exploration plan 325. A value in a sensor ID column 601 corresponds to information for identifying the sensor terminal 103 or the MEMS acceleration sensor 201 used in exploration. Information in an exploration field column 602 corresponds to information for identifying the exploration target area, and may correspond to, for example, a character string such as a country name, a region name, etc. or a code indicating the country name, the region name, etc.

Information in a ground surface geological feature column 603 corresponds to information indicating a geological feature of an earth surface of a region identified by the information in the exploration field column 602. This information preferably corresponds to information that can specify a propagation time or an attenuation factor of the surface wave 111a. A value in an installation location column 604 corresponds to information about a location at which the sensor terminal 103 is installed 305 for measurement 306, and may correspond to, for example, latitude and longitude. Alternatively, it is possible to describe an index indicating a size of the exploration area, and describe an average value of a distance (offset) between the sensor terminal 103 and the point of vibration 102. A value in an installation period column 605 corresponds to a value of a period from the installation 305 to the collection 307.

A value in an environment column 606 corresponds to information related to an environment of a region identified by the information in the exploration field column 602, and corresponds to, for example, information about a temperature change or a road surface condition. The temperature change or the road surface condition corresponds to information collected before the exploration, and may correspond to information that is generally open regardless of exploration. The environment column 606 may include an item corresponding to one of the temperature change and the road surface condition, or include an item other than these items.

Information in a transportation column 607 corresponds to information for specifying a vehicle or a ship used for transportation of the sensor terminal 103, and corresponds to information for specifying the trailer 302, the ship 303, the trailer 304, the trailer 308, the ship 309, and the trailer 310. The vehicle or the ship used for transportation of the sensor terminal 103 may correspond to a vehicle or a ship which reduces vibration or controls temperature. Thus, the information preferably corresponds to information about the vehicle or the ship capable of specifying vibration applied to the sensor terminal 103 or temperature.

When temperature changes in the rack 301, information about the rack 301 capable of specifying temperature may be included as the information in the transportation column 607.

FIG. 6 is a diagram illustrating an example of information related to the group of vibration generating vehicles 101 in the exploration plan 325. A value in a column of the group ID of vibration generating vehicles 701 corresponds to a value for identifying the group of vibration generating vehicles 101, and this value corresponds to the group ID of vibration generating vehicles. Information in an exploration field column 702 corresponds to the information in the exploration field column 602, and the group of vibration generating vehicles 101 and the sensor terminal 103 used for one exploration are associated with each other by the information in an exploration field column 702 and the information in the exploration field column 602.

A value in a vibration location column 703 corresponds to information about a location of the point of vibration 102 at which the group of vibration generating vehicles 101 identified by information in the column of the group ID of vibration generating vehicles 701 generates vibration, and may correspond to, for example, longitude and latitude. Since there is the plurality of points of vibration 102 as described with reference to FIG. 1, there is a plurality of information items about this location related to one group of vibration generating vehicles 101. The value in the vibration location column 703 preferably corresponds to a value at which a distance between a vibration generation location and an installation location can be calculated by calculation with respect to the value in the installation location column 604.

A value in a vibration generation time column 704 corresponds to a time at which vibration is generated at a location specified by a plurality of information items included in the vibration location column 703. A value in a vibration intensity column 705 corresponds to intensity at which the group of vibration generating vehicles 101 identified by the information in the column of the group ID of vibration generating vehicles 701 generates vibration. The value in the vibration intensity column 705 preferably corresponds to a value that allows calculation of acceleration of vibration at the installation location from the distance between the vibration generation location and the installation location and the information in the ground surface geological feature column 603.

In addition to the information described above, the exploration plan 325 may include information that influences deterioration of the MEMS acceleration sensor 201. In addition, the information described above may be included as another item. For example, temperature during transportation described with reference to FIG. 5 may be replaced with information of the vehicle in the transportation column 607 and included in the exploration plan 325. Further, the exploration plan 325 may include information on a past plan to be distinguished from the schedule by a period and a time.

Figures 7, 8:
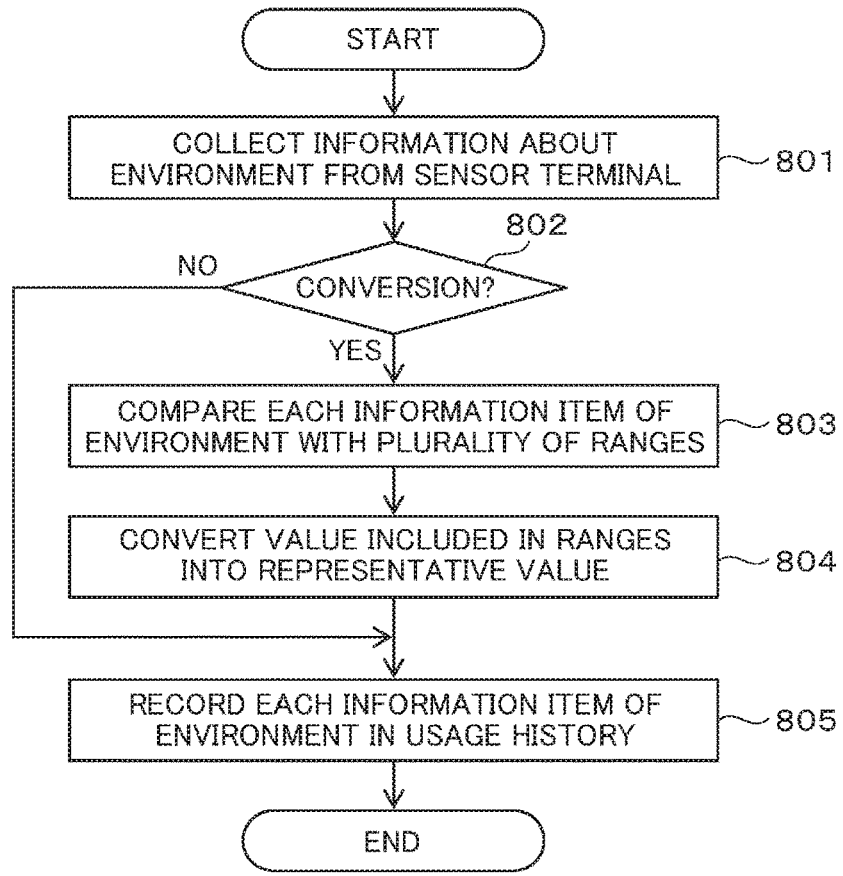
FIG. 7 is a diagram illustrating an example of a process of recording in history information.
FIG. 8 is a diagram illustrating an example of a range related to each information item of an environment.

FIG. 7 is a diagram illustrating an example of a process of recording in the usage history 324. As described above, the computer 321 collects information from the sensor terminal 103 and records the collected information in the usage history 324. For this process, first, the computer 321 collects information about an environment detected by the environmental sensor 207 of the sensor terminal 103 (step 801). For this collection, the computer 321 may collect information from the sensor terminal 103 stored in the rack 301 via the rack 301, or may collect information from the sensor terminal 103 by wireless communication via the observation vehicle 106 or the satellite 105.

Subsequently, it is determined whether the computer 321 is set to perform conversion (step 802). Setting of this conversion may correspond to information input in advance from the input/output terminal 322 and correspond to information stored by the computer 321. When it is determined that the computer 321 is set not to perform conversion, the operation proceeds to step 805, and each information item collected in step 801 is recorded in each item of the usage history 324.

When it is determined that the computer 321 is set to perform conversion in step 802, the operation proceeds to step 803 to compare each information item collected in step 801 with a plurality of ranges, and a value included in the compared ranges is converted into a representative value in step 804. FIG. 8 is a diagram illustrating an example of a range related to each information item of an environment.

In FIG. 8, information in an environment item column 901 corresponds to, for example, an "impact value", "temperature", and "humidity", and corresponds to the item in the environment column 503 of the usage history 324. A value in a range column 902 corresponds to information indicating a plurality of ranges with respect to each of information items in the environment item column 901, and a value in a representative value column 903 corresponds to a value representing each of the ranges.

In the example of FIG. 8, with regard to the "impact value", "5G-1G", that is, a range of 5G to 1G, "1G-0.5G", that is, a range of 1G to 0.5G, "0.5G-0G", that is, a range of 0.5G to 0G, and representative values of "SHX", "SHY", and "SHZ" for the respective ranges are set.

Here, it is preferable that three corresponding to the number of values included in the representative value column 903 with respect to the "impact value" which is one information item of the environment item column 901 is fewer than the total number of detectable values based on resolution of the environmental sensor 207 that detects the "impact value". In addition, it is preferable that the information amount (number of bits) of "SHX" which is a value in the representative value column 903 is smaller than the information amount of a value detected by the environmental sensor 207 that detects the "impact value". By reducing the information amount in this manner, a storage capacity of the usage history 324 can be reduced by conversion into the representative value.

In addition, an upper limit and a lower limit of a range is set such that a range of the range column 902 with respect to the "impact value" corresponds to "5G-1G" in the installation 305, corresponds to "1G-0.5G" in the transportation by the trailer 302 or the ship 303, and corresponds to "0.5G-0G" in the measurement 306. By performing setting in this manner, a pressure sensor that detects stepping rather than the acceleration sensor may be provided as the environmental sensor 207 at an upper portion of the sensor terminal 103, and detection of the pressure sensor may be converted into "SHX". Further, conversion into "SHZ" may be performed based only on setting of a transportation time rather than the acceleration sensor.

With regard to the "temperature", "100° C.-40° C.", that is, a range of 100 degrees to 40 degrees, "40° C.-0° C.", that is, a range of 40 degrees to degree, "0° C.--30° C.", that is, a range of 0 degree to minus 30 degrees, and representative values of "TMX", "TMY", and "TMZ" for the respective ranges are set. Hereinafter, with regard to the "humidity", similar setting is performed.

A description will be given based on the values shown in FIG. 8. The computer 321 compares a value corresponding to the "impact value" in the information collected in step 801 with a range in the range column 902 (step 803), determines that the value is within the range of "5G-1G" when the value is, for example, 3G, and converts 3G into "SHX" by replacing 3G with "SHX" (step 804). The computer 321 records each value converted in step 804 in each item of the usage history 324 as information (step 805).

FIG. 9 is a diagram illustrating an example of a process of predicting deterioration. In this process, information of the deterioration model 323 is generated from information of the usage history 324, and a deterioration situation of the sensor terminal 103 used in exploration included in the exploration plan 325 is predicted using information of the exploration plan 325.

First, the computer 321 obtains a sensor ID used in exploration from the exploration plan 325 (step 811). Here, when a plurality of explorations is registered in the exploration plan 325, only a value in the sensor ID column 601 at which information about the exploration target area input from the input/output terminal 322 matches a value in the exploration field column 602 may be obtained as the sensor ID.

The computer 321 obtains a value in the post-manufacture elapsed time column 502, a value in the environment column 503, and a value in the acceleration value column 504 at which a value of the sensor ID obtained in step 811 matches a value in the sensor ID column 501 of the usage history 324 (step 812). When a plurality of items is included in the environment column 503, values of some of the items may be obtained, or values of all the items may be obtained.

The computer 321 obtains information in the environment column 606 from the exploration plan 325 (step 813). Here, it is possible to obtain information in the ground surface geological feature column 603, information in the installation location column 604, information in the installation period column 605, information in the transportation column 607, information in the vibration location column 703, and information in the vibration intensity column 705.

The computer 321 applies the information obtained in steps 812 and 813 to the deterioration model (step 814). Here, each value in the environment column 606 may be corrected using information in the ground surface geological feature column 603, information in the installation location column 604, information in the installation period column 605, information in the transportation column 607, information in the vibration location column 703, and information in the vibration intensity column 705. For example, the temperature change in the environment column 606 may be corrected using a temperature adjustment value of a vehicle in the transportation column 607.

In addition, an impact during transportation may be calculated based on information about the road surface condition in the environment column 606, the trailer 304 in the transportation column 607, etc., and acceleration of the surface wave 111a calculated based on a value in the vibration intensity column 705, a value in the ground surface geological feature column 603, and a calculated distance from a value in the installation location column 604 to a value in the vibration location column 703 may be set as an impact in a period of the measurement 306.

The computer 321 outputs a value of the degree of deterioration output in step 814 to the input/output terminal 322 (step 815). The output value of the degree of deterioration is compared with a preset threshold value, and may be converted into information such as high possibility of being damaged due to deterioration or determined as a deterioration state. Alternatively, the degree of deterioration calculated in step 815 may be converted into a correction value, and the converted correction value may be set in the sensor terminal 103 via the rack 301.

The deterioration model generated in step 813 may not correspond to information accumulated as the deterioration model 323, and may be calculated from the information in the usage history 324. For example, a cumulative value obtained by multiplying an impact value by a temperature in the environment column 503 may be added to a value in the post-manufacture elapsed time column 502. In addition, previous setting as a calculation formula or information about the deterioration model 323 is allowed.

In the above description, an ID is assigned to the sensor terminal 103 or the MEMS acceleration sensor 201, and indication diagnosis is individually performed. However, indication diagnosis may be performed on a group basis by assigning a group ID to a group receiving similar load. Since the sensor terminal 103 is used in thousands of units even for small-scale exploration, the amount of load received will be similar in units of 100 to 1,000 units.

Therefore, when IDs are managed using groups as units to predict deterioration using a representative one among the groups, deterioration of all the groups may be predicted without predicting deterioration for the total number. In this case, even though the amount of calculation is reduced when compared to the case of individual prediction, prediction accuracy deteriorates, and thus this point needs to be taken into account.

Alternatively, it is possible to estimate a received load and a load received by subsequent exploration in a simplified way by abstracting and modeling an exploration field, a transportation route, and a storage environment. In this case, prediction may be performed through simple calculation. For example, rough environmental data may be given to a model of the exploration field by providing models such as a desert, tundra, an urban area, a jungle, etc., and further giving information about a region, a season, etc. thereto.

For example, in the case of setting of a desert area in the Middle East in July, temperature, temperature change, humidity, humidity change, etc. in an exploration period can be assumed from information available in the past and weather forecast, etc. Furthermore, a received load may be assumed by including information about the exploration period, the number of times of vibration generation, the number of times of installation, etc.

As described above, it is possible to manage the information about the external environment influencing the MEMS acceleration sensor 201 as the usage history 324 for each individual of the MEMS acceleration sensor 201. Further, a degree of deterioration of the MEMS acceleration sensor 201 can be generated as the deterioration model 323 using the usage history 324, and information about deterioration of the MEMS acceleration sensor 201 in scheduled exploration may be obtained by applying the exploration plan 325 related to the scheduled exploration to the deterioration model 323.

In this way, deteriorating sensor terminals 103 are indicated as a certain probability distribution in subsequent exploration. Thus, it is possible to select sensor terminals 103 to be brought, or set the number of sensor terminals 103 to be brought in a stochastically expressed from. For example, 500 extra pieces may be brought such that a preset threshold value, for example, a probability of 100 thousand normal operations during an exploration period becomes 99.8%. In this way, the number is smaller and statistical reliability is obtained when compared to the case of taking spare without grounds.

REFERENCE SIGNS LIST

103: sensor terminal
201: MEMS acceleration sensor
202: acceleration signal processor
204: processor
207: environmental sensor
301: rack
305: installation
306: measurement
321: computer
323: deterioration model
324: usage history
325: exploration plan

The invention claimed is:
1. An exploration system comprising:
an artificial seismic source;
a plurality of sensor terminals;
an environmental sensor; and
a computer, wherein:
each of the plurality of sensor terminals includes:
a velocity or acceleration sensor that detects a vibration generated by the artificial seismic source, and
an identifier unique to the velocity or acceleration sensor, the environmental sensor:
detects an external environment influencing the velocity or acceleration sensor, and
the computer:
records a deterioration model indicating, as a degree of deterioration, performance deterioration of the velocity or acceleration sensor by providing information about an external environment as a variable:
associates, with the identifier, the information about the external environment detected by the environmental sensor,
records the information about the external environment as a usage history, and
determines a deterioration state of the velocity or acceleration sensor or the sensor terminals based on the deterioration model.

2. The exploration system according to claim 1, wherein the external environment influencing the velocity or acceleration sensor includes a temperature and an impact.

3. The exploration system according to claim 1, wherein the velocity or acceleration sensor includes a micro electro mechanical systems (MEMS) acceleration sensor and has an elastic body that absorbs a vibration.

4. The exploration system according to claim 1, wherein:
a first sensor terminal among the plurality of sensor terminals has an identifier as a first identifier,
a second sensor terminal among the plurality of sensor terminals has an identifier as a second identifier, and
the computer:
records information about a first external environment detected by an environmental sensor included in the first sensor terminal as a usage history together with the first identifier, and
records information about a second external environment detected by an environmental sensor included in the second sensor terminal as a usage history together with the second identifier.

5. The exploration system according to claim 4, wherein the computer:
obtains an identifier of a sensor terminal used for exploration from an exploration plan,
obtains information about an external environment from a usage history of the sensor terminal based on the identifier obtained from the exploration plan,
obtains information about an external environment scheduled to be explored from the exploration plan,
applies information about the external environment obtained from the usage history and the exploration plan to the deterioration model, and
outputs a degree of deterioration obtained by application to determine a deterioration state based on the degree of deterioration.

6. The exploration system according to claim 1, wherein the exploration system includes:
a rack that stores the plurality of sensor terminals, communicates with the plurality of sensor terminals, and communicates with the computer, and
the computer:
obtains an identifier of each of the plurality of sensor terminals and information about an external environment from the plurality of sensor terminals via the rack.

7. The exploration system according to claim 1, wherein the computer:
obtains a ground surface geological feature of an area scheduled to be explored, an installation location of a sensor terminal used for exploration, and a vibration location and a vibration intensity of an artificial seismic source used for exploration from an exploration plan,
calculates a vibration of a surface wave from the artificial seismic source at an installation location of the sensor terminal used for exploration, and
applies the calculated vibration of the surface wave to the deterioration model as the information about the external environment.

8. The exploration system according to claim 1, wherein the computer:
obtains a temperature or a vibration in transportation of a sensor terminal used for exploration or information related to the temperature and the vibration from an exploration plan, and
applies the obtained information to the deterioration model as the information about the external environment.

9. The exploration system according to claim 8, wherein the computer:
converts the information about the external environment detected by the environmental sensor into information related to the transportation of the sensor terminal used for exploration and information related to a state other than the transportation, and records the converted information as the usage history based on the identifier.

10. A diagnosing method by a computer of an exploration system including an artificial seismic source, a plurality of sensor terminals, and an environmental sensor, wherein the computer:
records information about an external environment influencing a velocity or acceleration sensor that detects a vibration of each of the plurality of sensor terminals detected by the environmental sensor as a usage history based on an identifier unique to the velocity or acceleration sensor, and
determines a deterioration state of the velocity or acceleration sensor or the sensor terminals based on a deterioration model allowed to indicate, as a degree of deterioration, performance deterioration of the velocity or acceleration sensor by providing information about an external environment as a variable.

11. The diagnosing method according to claim 10, wherein the external environment influencing the velocity or acceleration sensor includes a temperature and an impact.

12. The diagnosing method according to claim 10, wherein the velocity or acceleration sensor includes a micro electro mechanical system (MEMES) acceleration sensor and has an elastic body that absorbs a vibration.

13. The diagnosing method according to claim 10, wherein:
an identifier of a first sensor terminal among the plurality of sensor terminals corresponds to a first identifier,
an identifier of a second sensor terminal among the plurality of sensor terminals corresponds to a second identifier, and the computer:

records information about a first external environment detected by an environmental sensor of the first sensor terminal as a usage history together with the first identifier; and records information about a second external environment detected by an environmental sensor of the second sensor terminal as a usage history together with the second identifier.

14. The diagnosing method according to claim 13, wherein the computer:

obtains an identifier of a sensor terminal used for exploration from an exploration plan, obtains information about an external environment from a usage history of the sensor terminal based on the identifier obtained from the exploration plan, obtains information about an external environment scheduled to be explored from the exploration plan, applies information about the external environments obtained from the usage history and the exploration plan to the deterioration model, and outputs a degree of deterioration obtained by application to determine a deterioration state based on the degree of deterioration.

15. The diagnosing method according to claim 14, wherein the computer:

obtains information about an identifier and an external environment of each of the plurality of sensor terminals from the plurality of sensor terminals when the plurality of sensor terminals is stored.

* * * * *